United States Patent
O'Connor et al.

(10) Patent No.: US 11,765,993 B2
(45) Date of Patent: Sep. 26, 2023

(54) CONTROL SYSTEM DETECTING FILL LEVEL ON RECEIVING VEHICLE(S)

(71) Applicant: Deere & Company, Moline, IL (US)

(72) Inventors: Kellen O'Connor, Clive, IA (US); Jeremy J. Faust, Grimes, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/321,584

(22) Filed: May 17, 2021

(65) Prior Publication Data

US 2022/0361404 A1    Nov. 17, 2022

(51) Int. Cl.
| | | |
|---|---|---|
| *A01D 41/127* | (2006.01) | |
| *G06T 7/62* | (2017.01) | |
| *G01C 21/00* | (2006.01) | |
| *B60K 35/00* | (2006.01) | |
| *G01F 23/00* | (2022.01) | |
| *G06F 3/14* | (2006.01) | |
| *G06T 11/40* | (2006.01) | |

(52) U.S. Cl.
CPC .......... *A01D 41/1275* (2013.01); *B60K 35/00* (2013.01); *G01C 21/3841* (2020.08); *G01F 23/00* (2013.01); *G06F 3/14* (2013.01); *G06T 7/62* (2017.01); *G06T 11/40* (2013.01); *B60K 2370/152* (2019.05); *B60K 2370/16* (2019.05)

(58) Field of Classification Search
None
See application file for complete search history.

(56) References Cited

U.S. PATENT DOCUMENTS

| | | | |
|---|---|---|---|
| 5,575,316 A * | 11/1996 | Pollklas | A01D 43/073 141/198 |
| 5,749,783 A | 5/1998 | Pollklas | |
| 5,957,773 A * | 9/1999 | Olmsted | A01D 41/1272 460/7 |
| 6,097,425 A | 8/2000 | Bahnke et al. | |
| 6,216,071 B1 * | 4/2001 | Motz | A01D 41/12 340/988 |
| 6,587,772 B2 | 7/2003 | Behnke | |
| 7,877,181 B2 * | 1/2011 | Chervenka | A01D 41/1275 701/50 |

(Continued)

FOREIGN PATENT DOCUMENTS

| | | |
|---|---|---|
| DE | 19647522 A1 | 5/1998 |
| DE | 202012103730 U1 | 10/2012 |

(Continued)

OTHER PUBLICATIONS

U.S. Appl. No. 17/360,282, filed Jun. 28, 2021, Application and Drawings, 51 pages.

(Continued)

*Primary Examiner* — Jason A Pringle-Parker
(74) *Attorney, Agent, or Firm* — Joseph R. Kelly; Kelly, Holt & Christenson PLLC

(57) ABSTRACT

A detector detects an overall fill level of a receiving vehicle. A mobile device on the receiving vehicle includes a mobile application that receives and displays the overall fill level of the receiving vehicle. The overall fill level can be overlaid on a geographic map that shows locations of multiple receiving vehicles, in which case an overall fill level indicator for each receiving vehicle is displayed on the geographic map as well.

16 Claims, 13 Drawing Sheets

(56) References Cited

U.S. PATENT DOCUMENTS

| | | | |
|---|---|---|---|
| 8,499,537 B2* | 8/2013 | Correns | A01D 43/087 56/10.2 E |
| 9,043,096 B2* | 5/2015 | Zielke | A01D 41/127 701/50 |
| 9,119,342 B2 | 9/2015 | Bonefas | |
| 9,188,986 B2 | 11/2015 | Baumann | |
| 9,642,305 B2* | 5/2017 | Nykamp | A01D 41/1217 |
| 9,949,435 B2* | 4/2018 | Banks, Jr. | E05F 15/70 |
| 10,264,723 B2* | 4/2019 | Gresch | A01C 15/003 |
| 10,368,488 B2* | 8/2019 | Becker | G01F 23/2961 |
| 10,609,864 B2* | 4/2020 | Conrad | A01D 41/1275 |
| 10,830,634 B2* | 11/2020 | Blank | G01G 19/086 |
| 2002/0082757 A1 | 6/2002 | Behnke | |
| 2004/0004544 A1 | 1/2004 | Knutson | |
| 2006/0240884 A1* | 10/2006 | Klimmer | A01D 41/1275 460/119 |
| 2007/0135190 A1* | 6/2007 | Diekhans | G05D 1/0278 460/1 |
| 2008/0083475 A1* | 4/2008 | Lamb | B67D 1/0871 141/198 |
| 2009/0044505 A1 | 2/2009 | Huster et al. | |
| 2010/0042297 A1 | 2/2010 | Foster et al. | |
| 2010/0285855 A1* | 11/2010 | Chervenka | A01D 41/1275 460/119 |
| 2010/0332051 A1 | 12/2010 | Kormann | |
| 2011/0061762 A1* | 3/2011 | Madsen | B65G 67/32 141/1 |
| 2011/0213531 A1* | 9/2011 | Farley | A01D 41/1275 701/50 |
| 2011/0307149 A1 | 12/2011 | Pighi et al. | |
| 2012/0215394 A1 | 8/2012 | Wang et al. | |
| 2012/0221213 A1* | 8/2012 | Seeger | A01F 15/101 701/50 |
| 2012/0263560 A1 | 10/2012 | Diekhans et al. | |
| 2012/0265412 A1 | 10/2012 | Diekhans et al. | |
| 2012/0302299 A1* | 11/2012 | Behnke | A01B 69/008 460/6 |
| 2013/0166344 A1 | 6/2013 | Grothaus et al. | |
| 2014/0082442 A1 | 3/2014 | Whetsei | |
| 2015/0264866 A1* | 9/2015 | Foster | A01D 41/1217 414/21 |
| 2016/0348324 A1 | 12/2016 | Engelmann et al. | |
| 2017/0042088 A1 | 2/2017 | Nykamp et al. | |
| 2017/0082442 A1 | 3/2017 | Anderson | |
| 2017/0088147 A1* | 3/2017 | Tentinger | B60K 35/00 |
| 2017/0208742 A1* | 7/2017 | Ingibergsson | A01D 41/127 |
| 2018/0022559 A1 | 1/2018 | Knutson | |
| 2019/0261561 A1 | 8/2019 | Heitmann | |
| 2019/0332987 A1 | 10/2019 | Marsolek et al. | |
| 2020/0073543 A1 | 3/2020 | Koch et al. | |
| 2020/0090094 A1 | 3/2020 | Blank | |
| 2020/0128740 A1 | 4/2020 | Suleman | |
| 2020/0133262 A1 | 4/2020 | Suleman et al. | |
| 2020/0178049 A1* | 6/2020 | Suleman | H04W 76/14 |
| 2020/0319655 A1* | 10/2020 | Desai | A01D 90/00 |
| 2020/0325655 A1 | 10/2020 | Hageman | |

FOREIGN PATENT DOCUMENTS

| | | |
|---|---|---|
| DE | 102019202950 A1 | 9/2019 |
| EP | 1977640 A1 | 10/2008 |
| EP | 2311307 A1 | 4/2011 |
| EP | 2510775 A1 | 10/2012 |
| EP | 2798939 A1 | 11/2014 |
| EP | 2929773 B1 | 1/2018 |
| EP | 3315007 A1 | 5/2018 |
| EP | 3643159 A1 | 4/2020 |
| EP | 3760026 A1 | 1/2021 |
| WO | 2011104085 A1 | 9/2011 |
| WO | 2015011237 A2 | 1/2015 |
| WO | 2020038810 A1 | 2/2020 |

OTHER PUBLICATIONS

U.S. Appl. No. 17/386,975, filed Jul. 28, 2021, Application and Drawings, 54 pages.
U.S. Appl. No. 17/360,291, filed Jun. 28, 2021, Application and Drawings, 43 pages.
U.S. Appl. No. 17/210,691, filed Mar. 24, 2021, Application and Drawings, 60 pages.
U.S. Appl. No. 17/196,023, filed Mar. 9, 2021, Application and Drawings, 53 pages.
Extended European Search Report and Written Opinion issued in European Patent Application No. 22156203.6, dated Jul. 2022, in 11 pages.
Extended European Search Report issued in European Patent Application No. 22159163.9, dated Aug. 3, 2022, 7 pages.
Extended European Search Repost and Written Opinion issued in European Patent Application No. 22159163.9. dated Aug. 3, 2022, in 07 pages.
Extended European Search Repost and Written Opinion issued in European Patent Application No. 22177642.0 dated Nov. 11, 2022, 8 pages.
Extended European Search Report and Written Opinion issued in European Patent Application No. 22177644.6, dated Nov. 25, 2022, in 08 pages.
Extended European Search Report issued in European Patent Application No. 22183092.0, dated Mar. 24, 2023, 10 pages.
Extended European Search Report and Written Opinion issued in European Patent Application No. 22170901.7, dated Feb. 24, 2023, in 10 pages.

* cited by examiner

CONTROL SYSTEM DETECTING FILL LEVEL ON RECEIVING VEHICLE(S)

FIELD OF THE DESCRIPTION

The present description relates to mobile work machines. More specifically, the present description relates to detecting and communicating fill level when filling a receiving vehicle.

BACKGROUND

There are a wide variety of different types of mobile work machines such as agricultural vehicles and construction vehicles. Some vehicles are material loading vehicles that include harvesters, such as forage harvesters, sugar cane harvesters, combine harvesters, and other harvesters, that harvest grain or other crop. Such harvesters often unload material into receiving vehicles that may include carts which may be pulled by tractors or semi-trailers as the harvesters are moving. Some construction vehicles include vehicles that remove asphalt or other similar materials. Such machines can include cold planers, asphalt mills, asphalt grinders, etc. Such construction vehicles often unload material into a receiving vehicle, such as a dump truck or other vehicle with a receiving vessel.

It is not uncommon for there to be multiple receiving vehicles for every loading vehicle. For instance, in an example in which the material loading vehicle is a self propelled forage harvester, there may be a single harvester harvesting a field, but multiple receiving vehicles that are operating with that harvester. As one receiving vehicle becomes full, it drives away from the harvester to an unloading location, while another receiving vehicle takes its place adjacent the harvester so the harvester can continue unloading to that second receiving vehicle. Still other operations may have multiple harvesters in a single field, multiple harvesters in multiple different fields, multiple receiving vehicles per harvester, and multiple unloading locations where the receiving vehicles unload the material they are carrying.

The discussion above is merely provided for general background information and is not intended to be used as an aid in determining the scope of the claimed subject matter.

SUMMARY

A detector detects an overall fill level of a receiving vehicle. A mobile device on the receiving vehicle includes a mobile application that receives and displays the overall fill level of the receiving vehicle. The overall fill level can be overlaid on a geographic map that shows locations of multiple receiving vehicles, in which case an overall fill level indicator for each receiving vehicle is displayed on the geographic map as well.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
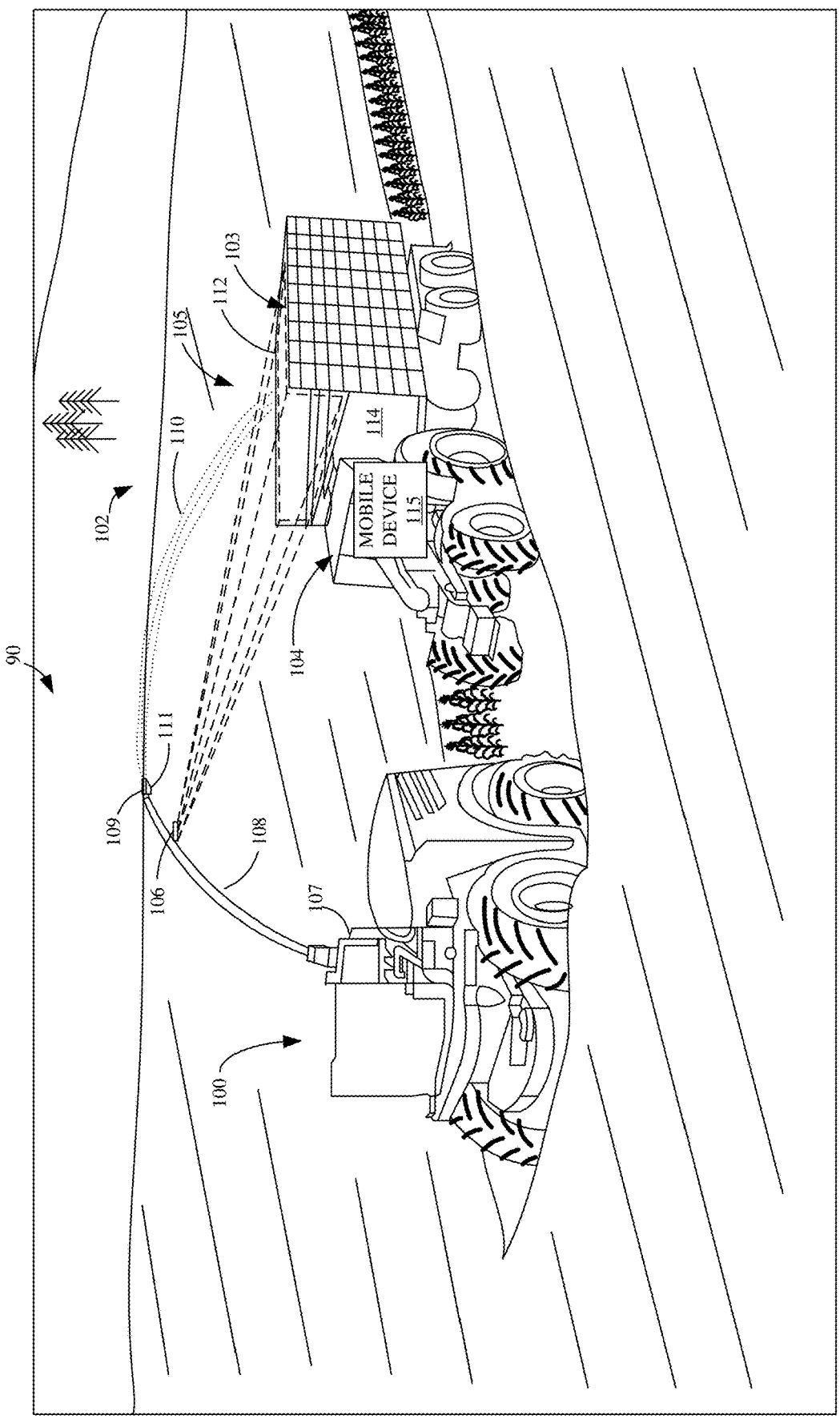
FIG. 1 is a pictorial illustration of one example of a work machine which comprises a forage harvester filling a receiving vehicle, with the receiving vehicle in a position behind the forage harvester.

The present discussion proceeds with respect to a material loading vehicle being an agricultural harvester, but it will be appreciated that the present discussion is also applicable to material loading systems in which the material loading vehicle is a construction machine or other material loading vehicle as well, such as those discussed elsewhere herein.

In many current forage harvesting operations, an operator of a self-propelled forage harvester communicates with drivers of receiving vehicles using a long-range radio. These harvesting operations may have multiple different forage harvesters operating in a single field or in multiple different fields. Such harvesting operations also may involve multiple different receiving vehicles taking material from the forage harvesters to one of a plurality of different silage pits or other drop off locations where the material is unloaded. This can create numerous problems.

For instance, each of the operators of the self-propelled forage harvesters attempt to communicate the fill level of the receiving vehicle, that is currently receiving material from the harvester, to operators of other receiving vehicles. This communication is done in an attempt to ensure that, as soon as a receiving vehicle reaches a desired fill level, another receiving vehicle is present to take its place so the forage harvester can operate substantially continuously.

However, in a harvesting operation where there are numerous harvesters and/or numerous receiving vehicles, it can be difficult for the drivers of the receiving vehicles to know where to go, and when to go there. The difficulty may be exacerbated because it is difficult for the drivers of the receiving vehicles to know when the other receiving vehicles that are currently being loaded by the harvesters are about to be filled. Thus, situations can arise where the harvester is waiting for a receiving vehicle in one field, while multiple receiving vehicles are lined up to receive material from a harvester in a different field, all wasting fuel and time.

The present description thus proceeds with respect to a system in which a mobile device can be carried on each of a plurality of different receiving vehicles. The mobile devices can run a mobile application. An automatic fill control system or another system on the harvester detects the overall fill level of the receiving vehicle that is currently being filled, and the overall fill level is transmitted to the mobile devices in all of the receiving vehicles. The overall fill level can then be displayed, on all of the mobile devices so that the operators of the receiving vehicles can make better choices as to where and when to position the receiving vehicle.

In one example, the overall fill level is indicated by a gauge display element. Also, in one example, a geographic map can be generated showing the field or fields where harvesting is taking place and also showing the geographic location of the harvesters and all of the receiving vehicles participating in the harvesting operation. The overall fill level corresponding to each of the receiving vehicles can be overlaid on or otherwise integrated into the map display so that all users of the mobile application can see the location of the harvesters, the location of the receiving vehicles, and the overall fill level of each of the receiving vehicles. The mobile applications may also include mileage counters that track the mileage covered by each individual receiving vehicle.

The overall fill level for receiving vehicles can be detected in a variety of different ways. In order to assist the operator of the harvester, some automatic cart filling control systems have been developed to automate portions of the filling process. One such automatic fill control system uses an image capture device, such as a stereo camera, on the spout of the harvester to capture an image (a static image or video image) of the receiving vehicle. An image processing system determines dimensions of the receiving vehicle and the distribution of the crop deposited inside the receiving vehicle. The system also detects crop height (or fill level) within the receiving vehicle, in order to automatically aim the spout toward empty spots and control the flap position to achieve a more even fill, while reducing spillage. Such systems can fill the receiving vehicle according to a fill strategy (such as front-to-back, back-to-front, etc.) that is set by the operator or that is set in other ways. Thus, the overall fill level of the receiving vehicle can be detected using the automatic fill control system.

However, this type of system does not assist the operator of the receiving vehicle in knowing where to go. Thus, even if a harvester has an automatic fill control system, the receiving vehicles can still waste fuel and time because the receiving vehicles may be in the wrong places.

FIG. 1 is a pictorial illustration showing one example of a material loading vehicle, which is a self-propelled forage harvester 100, followed by a receiving vehicle 102. Receiving vehicle 102 includes tractor 104 pulling grain cart 105. Cart 105 thus defines an interior that forms a receiving vessel 103 for receiving harvested material through a receiving area 112. In the example shown in FIG. 1, towing vehicle (e.g., a tractor) 104, that is pulling grain cart 105, is positioned directly behind forage harvester 100 and has a mobile device 115 which may be a smart phone, tablet computer, etc. either mounted in the operator compartment of tractor 104, or carried by the operator of tractor 104. Also, in the example illustrated in FIG. 1, forage harvester 100 has a camera 106 mounted on the spout 108 through which the harvested material 110 is traveling. The spout 108 can be pivotally or rotationally mounted to a frame 107 of harvester 100. Camera 106 can be a stereo-camera or a mono-camera that captures an image (e.g., a still image or video) of the receiving area 112 of cart 105. In the example shown in FIG. 1, the receiving area 112 is defined by an upper edge of the walls of cart 105.

When harvester 100 has an automatic fill control system that includes image processing, as discussed above, the automatic fill control system can gauge the height of harvested material in cart 105, and the location of that material. The automatic fill control system can also generate a metric indicative of an overall fill level of cart 105 based on the dimensions of cart 105 and the sensed level of material in cart 105. The automatic fill control system also identifies a fill level at the location (material landing point) in cart 105 where the material is currently loading. The automatic fill control system thus automatically controls the position of spout 108 and flap 109 to direct the trajectory of material 110 into the receiving area 112 of cart 105 to obtain an even fill throughout the entire length and width of cart 105, while not overfilling cart 105. By automatically, it is meant, for example, that the operation is performed without further human involvement except, perhaps, to initiate or authorize the operation.

For example, when executing a back-to-front automatic fill strategy the automatic fill control system may attempt to move the spout and flap so the material begins landing at a first landing point in the back of vessel 103. Then, once a desired fill level is reached in the back of vessel 103, the automatic fill control system moves the spout and flap so the material begins landing just forward of the first landing point in vessel 103. This continues until the vessel 103 reaches a desired overall fill level. The overall fill level of vessel 103 can be compared to a desired overall fill level (or an overall fill level threshold) which may be a default level, an operator-input level, or another level. The overall fill level in vessel 103 and how it compares to the desired overall fill level can be output to mobile device 115 for display to the operator of receiving vehicle 102, such as on a mobile application running on mobile device 115. The overall fill level in vessel 103 and the result of the comparison to the desired fill level can be sent to other mobile devices in other receiving vehicles as well so the operators of the other receiving vehicles can better decide where and when to position the receiving vehicles, as is discussed in greater detail below.

It can be seen in the example of FIG. 1 that the camera 106 can capture an image of a portion of the cart 105. For instance, it can capture an image of the forward portion 114 of cart 105. Thus, in one example, optical or visual features of that forward portion 114 of cart 105 can be used by an image processor to uniquely identify cart 105, or to identify the type of the cart 105. A unique cart identifier, or type identifier, can be used to automatically identify a size of cart 105 which may be set manually or downloaded from a manufacturer database or obtained in other ways. The overall fill level detected by harvester 100 can be correlated to a specific receiving vehicle 102 using the identifier identifying the receiving vehicle.

Figure 2:
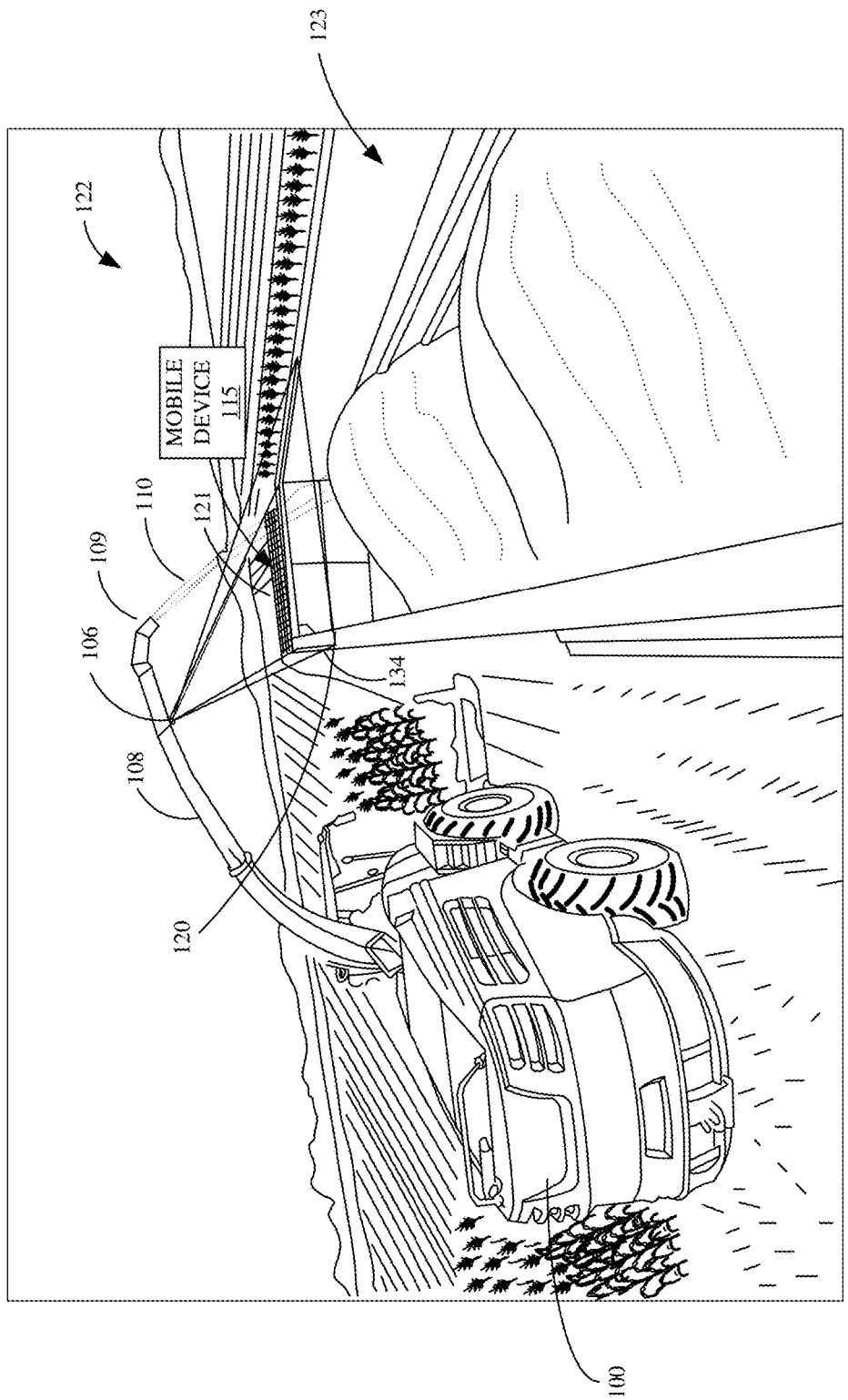
FIG. 2 is a pictorial illustration of one example of a work machine which comprises a forage harvester filling a receiving vehicle that is alongside the forage harvester.

FIG. 2 is a pictorial illustration showing another example of a self-propelled forage harvester 100, this time loading a receiving vehicle 122 that includes a semi-tractor 121, a semi-trailer (or receiving vessel) 123 in a configuration in which the semi-tractor 121 (that also has a mobile device 115) is pulling semi-trailer 123 alongside forage harvester 100. Therefore, the spout 108 and flap 109 are positioned to unload the harvested material 110 to fill trailer 123 according to a pre-defined side-by-side fill strategy. Again, FIG. 2 shows that camera 106 can capture an image (which can include a still image or video) of semi-trailer 123. In the example illustrated in FIG. 2, the field of view of camera 106 is directed toward the receiving area 120 of trailer 123 so that image processing can be performed to identify a landing point for the harvested material in trailer 123 and the height of material in trailer 123. An automatic fill control system can thus determine the overall fill level of trailer 123 and compare it to a desired overall fill level. The automatic fill control system on harvester 100 can also control spout 108 and flap 109 to fill trailer 123 as desired.

Also, in the example shown in FIG. 2, it can be seen that camera 106 can be positioned to have a field of view that captures an image of a side portion 134 of trailer 123. Thus, the visual or optical features of the side portion 134 of trailer 123 can be used to uniquely identify trailer 123, or at least to identify the type of the trailer 123. Based on the unique trailer identifier or the type identifier, the settings values for the automatic fill control system can be obtained (such as the dimensions of trailer 123, the desired fill pattern, the desired overall fill level, etc.) so that the trailer 123 is filled in a trailer-specific way or in a trailer type-specific way, depending upon whether the trailer is uniquely identified or the trailer type is identified. For example, once the trailer or trailer type is identified, the desired overall fill level for the trailer 123 can be retrieved and compared against the current overall fill level.

In other examples, where machine 100 is a combine harvester, it may be that the spout 108 is not moved relative to the frame during normal unloading operations. Instead, the relative position of the receiving vehicle 105, 123 and the combine harvester is changed in order to fill the receiving vehicle 105, 123 as desired. Thus, if a front-to-back fill strategy is to be employed, then the relative position of the receiving vessel, relative to the combine harvester, is changed so that the spout is first filling the receiving vessel at the front end, and then gradually fills the receiving vessel moving rearward. This is just one example.

Figure 3:
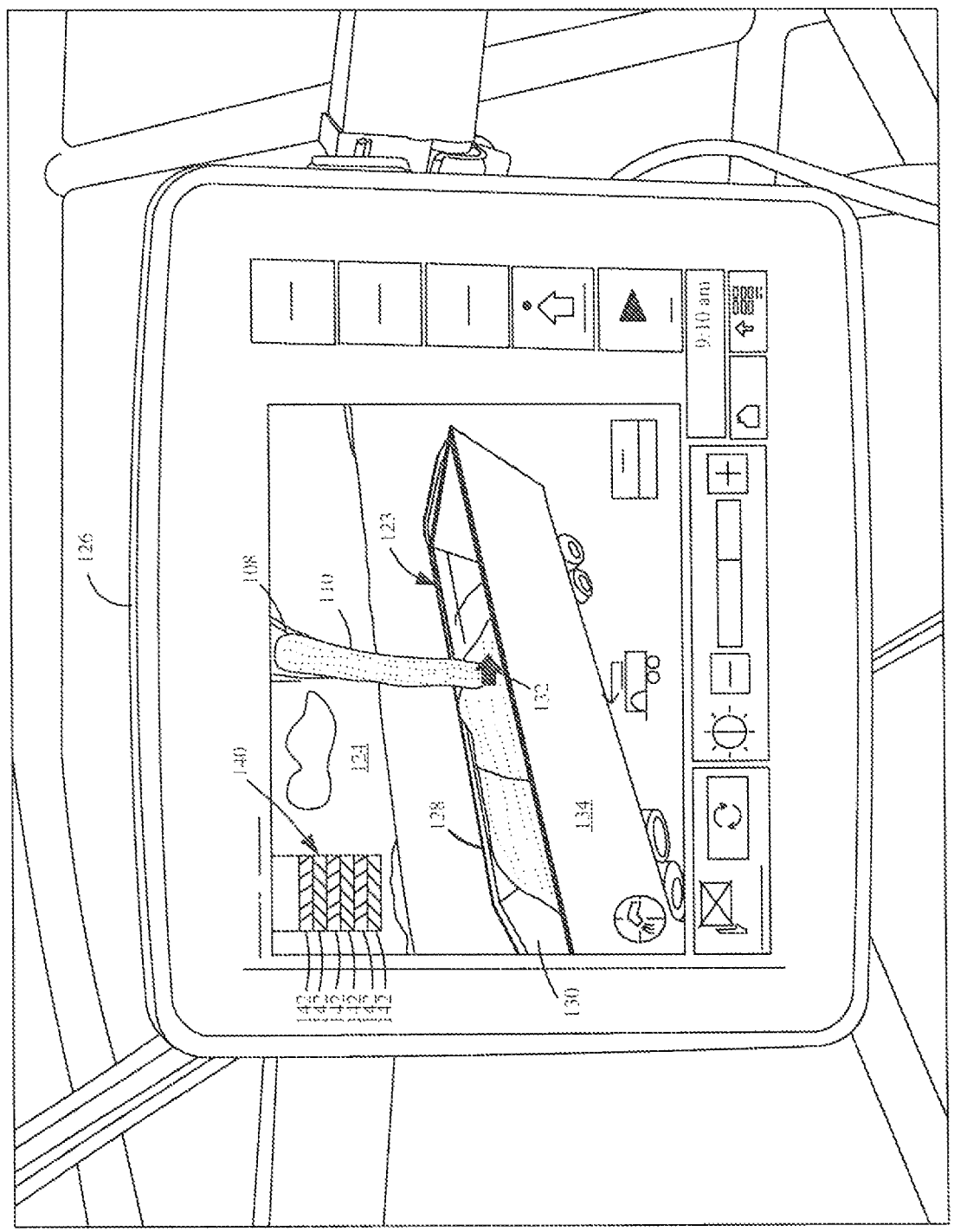
FIG. 3 is a pictorial illustration of an operator display showing video of a filling operation.

FIG. 3 is a pictorial illustration showing one example of an operator interface display 124 that can be displayed on a display mechanism 126, for the operator in an operator compartment of forage harvester 100, or on a display screen of a mobile device 115 in the operator compartment of receiving vehicle 102, 122. The display (or a portion of it), or the information used to generate the display, can also be sent to the mobile device 115 for use by the operator of the receiving vehicle 102, 122. The operator interface display 124 in FIG. 3 shows a view of images (static or video) captured by camera 106. The image(s) show material 110 entering trailer 123. An image processing system on harvester 100 illustratively identifies the perimeter of the opening 128 in trailer 123 and also processes the image of the material 110 in trailer 123 to determine the fill height relative to opening 128 and the overall fill level of trailer 123. The perimeter-defining opening 128 can be visually enhanced by overlaying a visual overlay over the opening 128 so that the operator can easily identify the opening 128, as it is being recognized by the image processing system.

FIG. 3 also shows that, once the overall fill level of trailer 123 is detected and calculated, an overall fill level indicator 140 can be displayed and dynamically updated as trailer 123 is filled. In the example shown in FIG. 3, overall fill level indicator 140 is generated as a gauge with bars 142 that are visually filled in (or lit up or otherwise visually distinguished) as the trailer 123 is filled. The bars 142 can be filled in from bottom to top to show the overall fill level of trailer 123. Also, the overall fill level of trailer 123 can be compared to a threshold overall fill level. Once the overall fill level of trailer 123 reaches the threshold overall fill level of trailer 123, then this can be indicated by the overall fill level indicator 140 by changing the color of indicator 140, blinking indicator 140, or in another visual way.

It should also be noted that, in an example in which forage harvester 100 has an automatic fill control system (or active fill control system) which fills trailer 123 according to a fill strategy (such as a back-to-front fill strategy, front-to-back fill strategy, etc.), a current landing position indicator (such as indicator 132) may be displayed to show the current landing position where material 110 is being loaded into trailer 123 through spout 108 and the direction that spout 108 is, or should be, moving relative to trailer 123 as the filling operation continues. It can be seen in FIG. 3, for instance, that indicator 132 is an arrow pointing in the front-to-back direction. The location of arrow 132 on the representation of trailer 123 indicates the current landing position, while the direction of the arrow 132 indicates the direction that spout 108 will be moved relative to trailer 123 in executing the selected front-to-back fill strategy.

Figure 4:
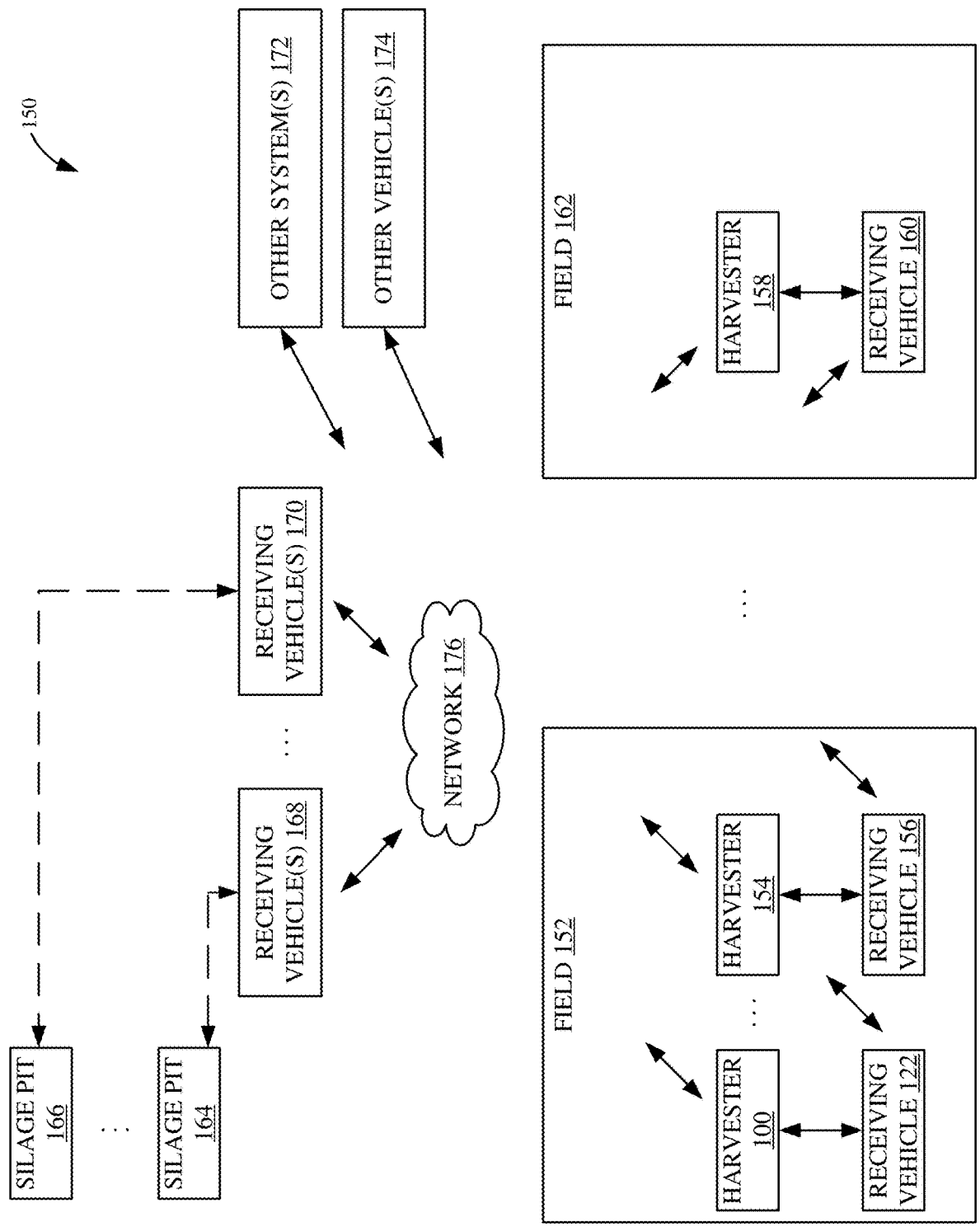
FIG. 4 is a block diagram showing one example of a material moving system which is an agricultural architecture.

FIG. 4 is a block diagram showing a material moving system that is an agricultural system 150 which is a relatively complex agricultural system where a harvesting operation is being performed. FIG. 4 shows that harvester 100 and receiving vehicle 122 are operating in a first field 152. Also, in the example shown in FIG. 4, a second harvester 154 and a second receiving vehicle 156 are also operating in field 152. Similarly, yet another harvester 158 and receiving vehicle 160 are operating in field 162. When the receiving vehicles 122, 156 and 160 are filled by the corresponding harvesters, they may drive to one of a plurality of different silage pits 164-166 where the material in the receiving vehicle is unloaded. There may be a single silage pit or multiple silage pits as shown in FIG. 4.

Also, in a harvesting operation such as that illustrated in FIG. 4, there may be a plurality of receiving vehicles for each harvester so that the harvesters 100, 154, and 158 can operate substantially continuously until the field they are harvesting has been fully harvested. Therefore, the agricultural system 150 shown in FIG. 4 shows a plurality of additional receiving vehicles 168-170. In one example, receiving vehicle 168 is filled with silage and is traveling to silage pit 166 to be unloaded. Receiving vehicle 170 has already unloaded its silage at silage pit 164 and is returning to fields 152-162 in order to be filled with more material from one of the harvesters 100, 154, and 158. The agricultural operation being performed in FIG. 4 may include other systems 172 and other vehicles 174 as well.

In the example shown in FIG. 4, all of the vehicles (harvesters 100, 154, and 158 as well as receiving vehicles 122, 156, 160, 168, and 170, as well as other vehicles 174 and other systems 172) can communicate with one another over a network 176. All of the vehicles may have communication systems that are suitable for communicating over network 176. In addition, some or all of the vehicles (such as the receiving vehicles 122, 156, 160, 168, and 170) may each have a mobile device, such as mobile device 115. Therefore, network 176 may be a wide area network, a local area network, a near field communication network, a WIFI network, a cellular communication network, or any of a wide variety of other networks or combinations of networks.

In addition, two vehicles may communicate over two different networks. For instance, when receiving vehicle 122 is close to harvester 100 such as when receiving vehicle 122 is being filled by harvester 100, then harvester 100 and receiving vehicle 122 may communicate using WIFI. However, when receiving vehicle 122 travels away from harvester 100 (such as when it travels to a silage pit 164 to be unloaded), then receiving vehicle 122 may communicate with harvester 100 using a mobile device over a cellular network. These and other networks or network combinations are contemplated herein.

It can be seen that in an agricultural system 150 such as that shown in FIG. 4, it can be difficult for the drivers of receiving vehicles 122, 156, 160, 168, and 170 to know where the most efficient location is for them to drive, after being unloaded at one of the silage pits 164-166. For instance field 152 may be several miles long with rolling or hilly terrain. Therefore, as receiving vehicle 170 approaches field 152, the operator of receiving vehicle 170 may not be able to see harvester 100. Thus, receiving vehicle 170 may enter the side of field 152 that is furthest from the harvester 100. This can mean that receiving vehicle 170 travels miles more than needed, and may cause harvester 100 to pause until the receiving vehicle 170 reaches its position adjacent harvester 100. Similarly, it can be difficult for the drivers of the receiving vehicles to know which harvester will need a receiving vehicle most quickly. The drivers of the receiving vehicles don't know the overall fill level of those receiving vehicles 122, 156, 160 that are currently being loaded.

Therefore, in one example, the mobile app on the mobile device 115 carried by receiving vehicle 170 obtains the geographic locations from each of the vehicles in agricultural system 150 and generates a geographic map of the area of fields 152 and 162 and silage pits 164-166. The mobile app then overlays onto the geographic map, or otherwise integrates into the geographic map, the location of each of the vehicles and the overall fill level of each of the receiving vehicles. Therefore, when the operator of receiving vehicle 170 is returning from silage pit 164, the operator can quickly view the geographic map to see the precise location of each of the harvesters 100, 154, and 158, as well as the overall fill level of each of the receiving vehicles 122, 156, and 160 that are being filled by the harvesters. The operator of receiving vehicle 170 can thus quickly determine where to drive in order to maintain the efficiency of the overall harvesting operation. In another example, a geographic map display may be generated by another system 172 or another vehicle 174 and transmitted to the receiving vehicles and transmitted to the other vehicles in agricultural system 150 through the mobile app. These and other configurations are contemplated herein.

Figure 5:
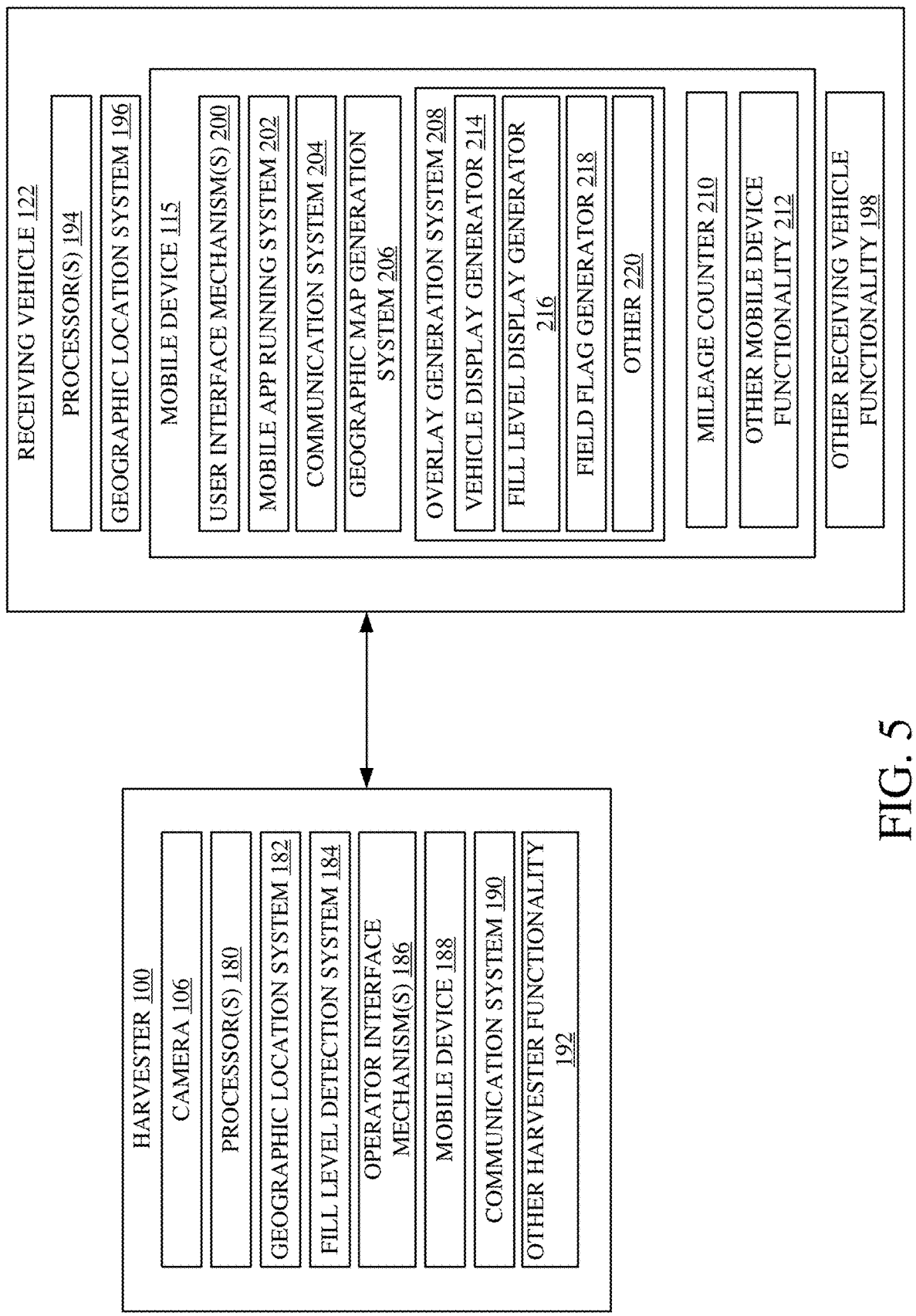
FIG. 5 is a block diagram showing one example of a harvester and a receiving vehicle.

FIG. 5 is a block diagram showing one example of harvester 100 and receiving vehicle 122. Harvester 100 illustratively includes one or more processors 180, geographic location system 182, fill level detection system 184, operator interface mechanisms 186, mobile device 188, communication system 190, and other harvester functionality 192.

Receiving vehicle 122 can include one or more processors 194, geographic location system 196, mobile device 115, and a wide variety of other receiving vehicle functionality 198. Mobile device 115 may include one or more user interface mechanisms 200, mobile application running system 202, communication system 204, geographic map generation system 206, overlay generation system 208, mileage counter 210, and other mobile device functionality 212. Overlay generation system 208 can include vehicle display generator 214, fill level display generator 216, field flag generator 218, and other items 220. Before describing the overall operation of harvester 100 and receiving vehicle 122 in agricultural system 150, a brief description of some of the items on harvester 100 and receiving vehicle 122 will first be described.

Processors 180 may be one or more central processing units with corresponding memory and timing circuitry. Geographic location system 182 illustratively detects the geographic location of harvester 100 within a local coordinate system or a global coordinate system and generates an output indicative of that location. Thus, geographic location system 182 may be a global position system (GPS) receiver or another global navigation satellite system (GNSS) receiver, a cellular triangulation system, a dead reckoning system, or another geographic location system.

Fill level detection system 184 may be part of an automatic fill control system or another type of fill level detection system 184. Fill level detection system 184 may receive an input from camera 106 and calculate a current overall fill level for the receiving vehicle 122 that is currently receiving harvested material from harvester 100. In one example, fill level detection system 184 includes an image processing computer system that processes the images from camera 106 to determine the height of material in receiving vehicle 122. Based upon the images, fill level detection system 184 detects the overall fill level in receiving vehicle 122. The overall fill level may be as a percent of total capacity of receiving vehicle 122 or another metric indicative of the overall fill level of receiving vehicle 122.

Operator interface mechanisms 186 can include pedals, a steering wheel, joysticks, levers, buttons, display screens with user actuatable icons or other user input mechanisms, or a wide variety of other audio, visual, and/or haptic mechanisms. Mobile device 188 may be a smartphone, a tablet computer, a laptop computer, or another type of mobile device. Communication system 190 may be a communication system that facilitates communication among the items of harvester 100 and with other vehicles and other systems over network 176. Therefore, communication system 190 may be one or more of a cellular communication system, a WIFI communication system, or a near field communication system. Communication system 190 may also be a controller area network (CAN) bus and a CAN bus controller and any of a wide variety of other communication systems or combinations of communication systems.

Processors 194 may include one or more central processing units, along with associated memory and timing circuitry. Geographic location system 196 may be similar to geographic location system 182 or different.

Mobile device 115 may also be similar to or different from mobile device 188. User interface mechanisms 200 can include a display screen, a touch sensitive display screen, buttons, a keypad, a point and click device, speakers, microphone and speech recognition functionality, and any of a wide variety of other user interface mechanisms. Mobile app running system 202 can include a processor and memory for running mobile apps. Communication system 204 can include radio technology, a WIFI communication system, or any of a wide variety of other communication systems, some of which are described below.

Geographic map generation system 206 can be a computing system that runs mapping software that acquires the current geographic location of receiving vehicle 122 from geographic location system 196, and also obtains the geographic location of other vehicles in agricultural system 150 and generates a geographic map. Communication system 204 also obtains the geographic location of each of the vehicles in agricultural system 150 and provides that location to overlay generation system 208. Communication system 204 can also obtain the fill levels from the various receiving vehicles and provide the fill levels to overlay generation system 208. Overlay generation system 208 then generates user interface display elements that are overlaid, or otherwise integrated into, the geographic map generated by geographic map generation system 206. Vehicle display generator 214 generates a vehicle location indicator identifying the location of each of the vehicles in agricultural system 150. Fill level display generator 216 generates a fill level display indicator or display element (such as display element 140 shown in FIG. 3) that is displayed on top of or closely proximate the vehicle display elements, for each receiving vehicle 122, 156, and 160 that are displayed on the geographic map display generated by geographic map generation system 206.

Where there are multiple fields that may be harvested during a harvesting operation, field flag generator 218 may generate a field flag that can be displayed on the geographic map to identify the particular fields that are being harvested during the harvesting operation. Thus, the operator of receiving vehicle 122 will be able to quickly identify the fields where harvesters are operating during the current harvesting operation.

Mileage counter 210 can accumulate the total mileage traveled by receiving vehicle 122 over a given time period (such as over a shift, over a day, over a harvesting operation, etc.). Mileage counter 210 can receive inputs from geographic location system 196 to aggregate the miles traveled or mileage counter 210 can generate the aggregate mileage traveled in other ways as well.

It will be noted that harvester 100 and receiving vehicle 122 are shown with various items of functionality. However, those items of functionality can be located elsewhere or split up in the agricultural system 150 shown in FIG. 4. For instance, instead of geographic map generation system 206 residing on mobile device 115, it may reside on another vehicle 174 or another system 172. The geographic map may be generated at the other vehicle or system and communicated to mobile device 115. These and other ways of changing the configuration of agricultural system 150 are contemplated herein.

Figure 6:
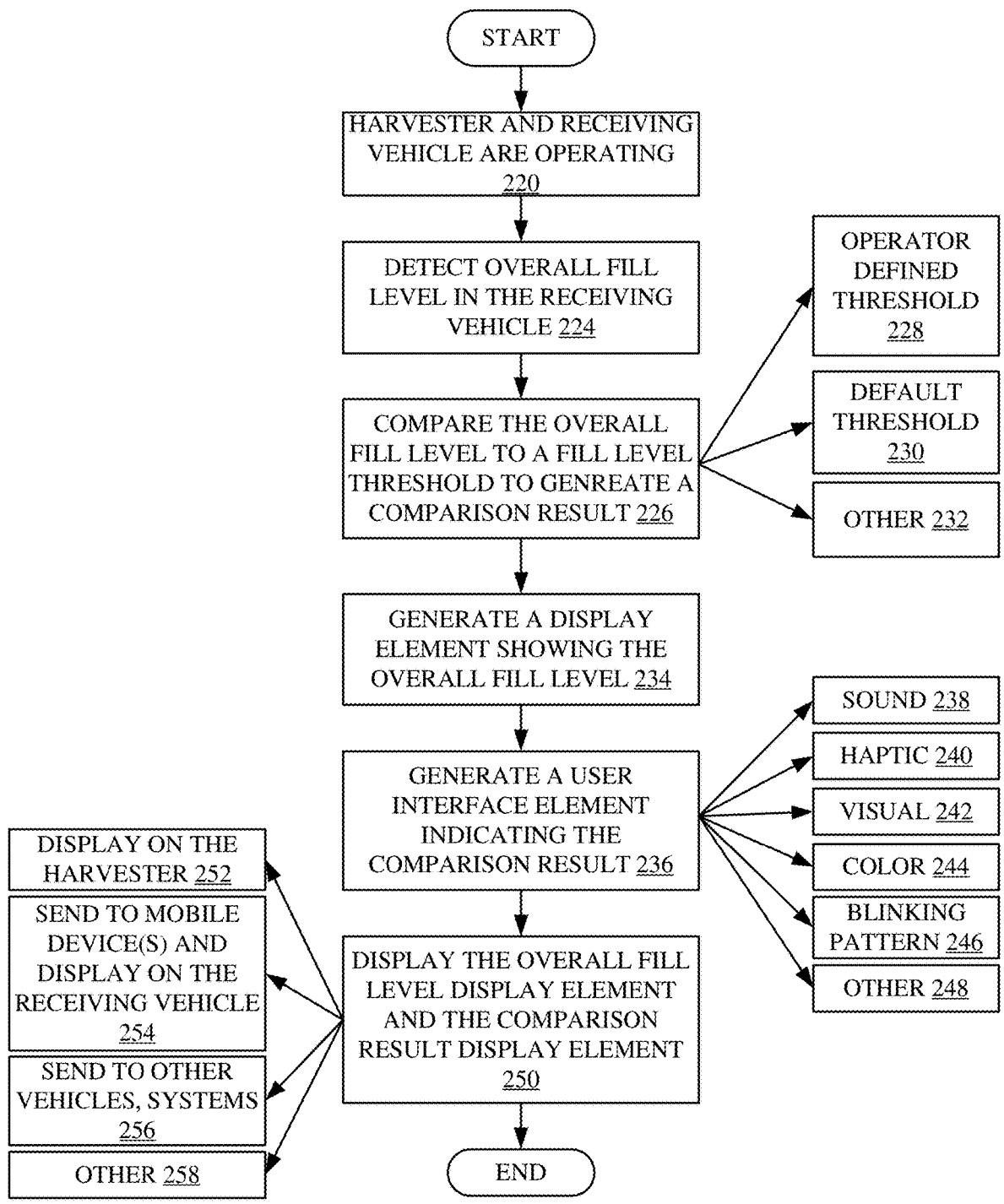
FIG. 6 is a flow diagram illustrating one example of detecting an overall fill level for a receiving vehicle and generating and displaying an overall fill level display element.

FIG. 6 is a flow diagram illustrating one example of the operation of fill level detection system 184 detecting the overall fill level of receiving vehicle 122 and having an overall fill level indicator generated and displayed on a display for the operator of harvester 100 and/or the operator of receiving vehicle 122. It is first assumed that harvester 100 and receiving vehicle 122 are operating and performing a harvesting operation, as indicated by block 220 in the flow diagram of FIG. 6. Fill level detection system 184 detects the overall fill level in receiving vehicle 122, as indicated by block 224. For instance, fill level detection system 184 may receive images captured by camera 106 and perform image processing on those images to identify the height of material within receiving vehicle 122 and to thus identify the overall fill level of receiving vehicle 122.

Fill level detection system 184 (or the mobile app running on mobile device 115) may then compare the overall fill level to a pre-defined or dynamic fill level threshold in order to generate a comparison result. Comparing the overall fill level to the fill level threshold is indicated by block 226 in the flow diagram of FIG. 6. The fill level threshold may be defined by the operator of harvester 100 or the operator of receiving vehicle 122 or another user, as indicated by block 228. The fill level threshold may be a default threshold 230, or another type of threshold 232.

An overall fill level display element is then generated so that the overall fill level display element can be displayed to the operator of harvester 100 and/or the operator of receiving vehicle 122 and/or the operators of other vehicles in agricultural system 150. In one example, the overall fill level indicator display element can be generated by fill level detection system 184 on harvester 100 and sent to receiving vehicle 122. In another example, the data indicative of the overall fill level can be sent to the fill level display generator 216 in the mobile app being run on mobile device 114 and the fill level display generator 216 can generate the overall fill level display element. Generating a display element showing the overall fill level is indicated by block 234 in the flow diagram of FIG. 6.

A user interface element is then generated that indicates that result of the comparison of the current overall fill level of receiving vehicle 122 to the fill level threshold for receiving vehicle 122, as indicated by block 236. For instance, fill level display generator 216 may generate the overall fill level display element as a gauge-type display element such as display element 140 shown in FIG. 3. Fill level display generator 216 may also indicate the result of the comparison of the overall fill level in vehicle 122 to the overall fill level threshold for receiving vehicle 122 by generating a sound 238 or a haptic output 240 (such as a vibration of mobile device 115) or a visual output 242. The visual output may be changing the color 244 of the overall fill level display element or blinking the overall fill level display element according to a blinking pattern 246. The display elements can be generated in other ways as well, as indicated by block 248.

The overall fill level display element and the comparison results are then displayed, as indicated by block 250 in the flow diagram of FIG. 6. The elements can be displayed on harvester 100, as indicated by block 252, or, if they are generated on harvester 100, they can be sent to mobile device 115 for display on the mobile device 115 to the operator of receiving vehicle 122 or other vehicles in agricultural system 150. Sending the display elements to the mobile device 115 and displaying them is indicated by block 254 in the flow diagram of FIG. 6. Also, in one example, the overall fill level and comparison values or data upon which the display elements are generated, can be sent receiving vehicle 122 and to other vehicles and systems in agricultural system 150 so that the display elements can be generated and displayed on the other vehicles and systems as well, as indicated by block 256. The overall fill level display element and the comparison results can be displayed in other ways as well, as indicated by block 258.

Figure 7:
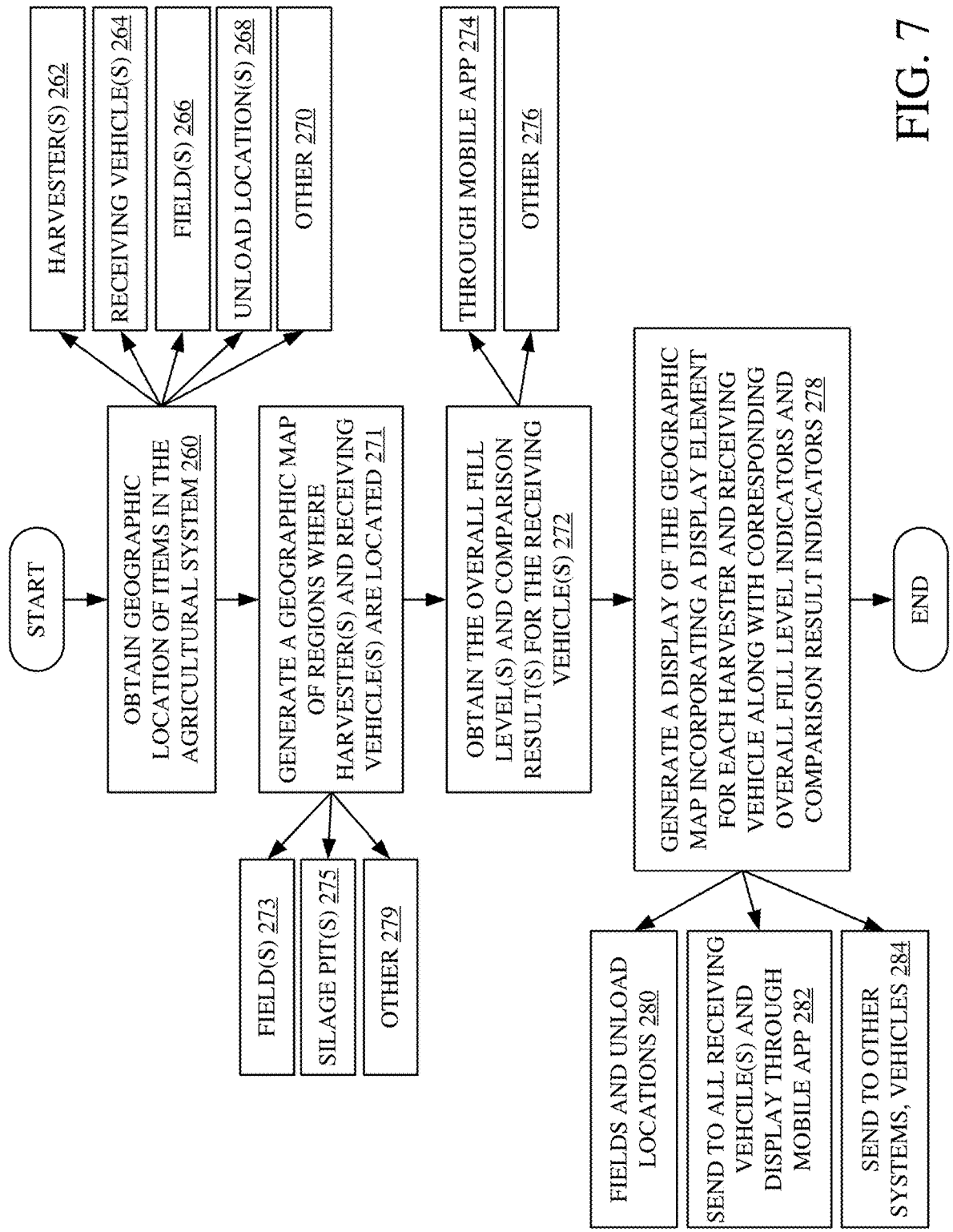
FIG. 7 is a flow diagram illustrating one example of the generation of a geographic map and integration of overall fill level display elements on the geographic map.

FIG. 7 is a flow diagram showing one example of the operation of geographic map generation system 206 and overlay generation system 208 in generating a geographic map of an area that contains fields that are being harvested, and then generating overlays on that map showing the locations of the vehicles involved in the harvesting operation and the overall fill level of the various receiving vehicles involved in the harvesting operation. It will be noted that geographic map generation system 206 and overlay generation system 208 may be located on the harvesters, on each of the receiving vehicles, on other systems 172, or other vehicles 174 in agricultural system 150, or geographic map generation system 206 and overlay generation system 208 may be distributed in agricultural system 150. Systems 206 and 208 are shown and described as being part of mobile device 115 on receiving vehicle 122 for the sake of example only.

Geographic map generation system 206 obtains a geographic location of receiving vehicle 122 from geographic location system 196. Geographic map generation system 206 may also receive a geographic location of the other vehicles and the fields and silage pits in agricultural system 150. The geographic location of the other vehicles and fields and silage pits may be obtained by operator input or may be obtained through the mobile app that is being run by mobile app running system 202. In another example, the geographic locations of the various items in agricultural system 150 may be received in a plurality of different ways. The geographic locations may be received over a WIFI connection from vehicles that are close to receiving vehicle 122. The geographic locations may be received over a cellular connection through the mobile app or otherwise from vehicles and items that are located further from receiving vehicle 122. All of these different ways of communicating the geographic location of items in agricultural system 150 to geographic map generation system 206 are contemplated herein. Obtaining the geographic location of the various items in the agricultural system 150 is indicated by block 260 in the flow diagram of FIG. 7. Receiving the geographic location of the various harvesters is indicated by block 262. Receiving the geographic location of the various receiving vehicles is indicated by block 264. Receiving the geographic location of the fields is indicated by block 266. Receiving the geographic location of the unload locations (such as the silage pits) is indicated by block 268. The geographic location of other items can be received as well, as indicated by block 270.

Geographic map generation system 206 then generates a map of the region where the harvesters and receiving vehicles are located, as indicated by block 271. The map may show the fields, as indicated by block 273, the silage pits as indicated by block 275, and/or items, as indicated by block 279.

Overlay generation system 208 then obtains the overall fill levels and the comparison results for the various receiving vehicles in agricultural system 150, as indicated by block 272 in the flow diagram of FIG. 7. The overall fill levels and the comparison results (of comparing the overall fill level to the fill level threshold for each vehicle) can be received through the mobile app as indicated by block 274. The overall fill levels for the various receiving vehicles and the comparison results can be received in other ways as well, as indicated by block 276.

Geographic map generation system 206 then controls user interface mechanisms 200 (and in one example a display screen) to generate a display of the geographic map incorporating a display element for each harvester and receiving vehicle along with the corresponding overall fill level indicators and comparison result indicators for each receiving vehicle. Generating such a display is indicated by block 278 in the flow diagram of FIG. 7. Geographic map generation system 206 can also generate a display showing the locations of the fields that are being harvested and the unload locations for the material, as indicated by block 280. Also, in one example, geographic map generation system 206 can control communication system 204 to send the map with the locations of all of the items in agricultural system 100 to other receiving vehicles through the mobile app, or in other ways. Sending the map display to other receiving vehicles through the mobile app is indicated by block 282. The map display can also be sent to the other systems 172 and other vehicles 174, as indicated by block 284 in the flow diagram of FIG. 7.

Figure 8:
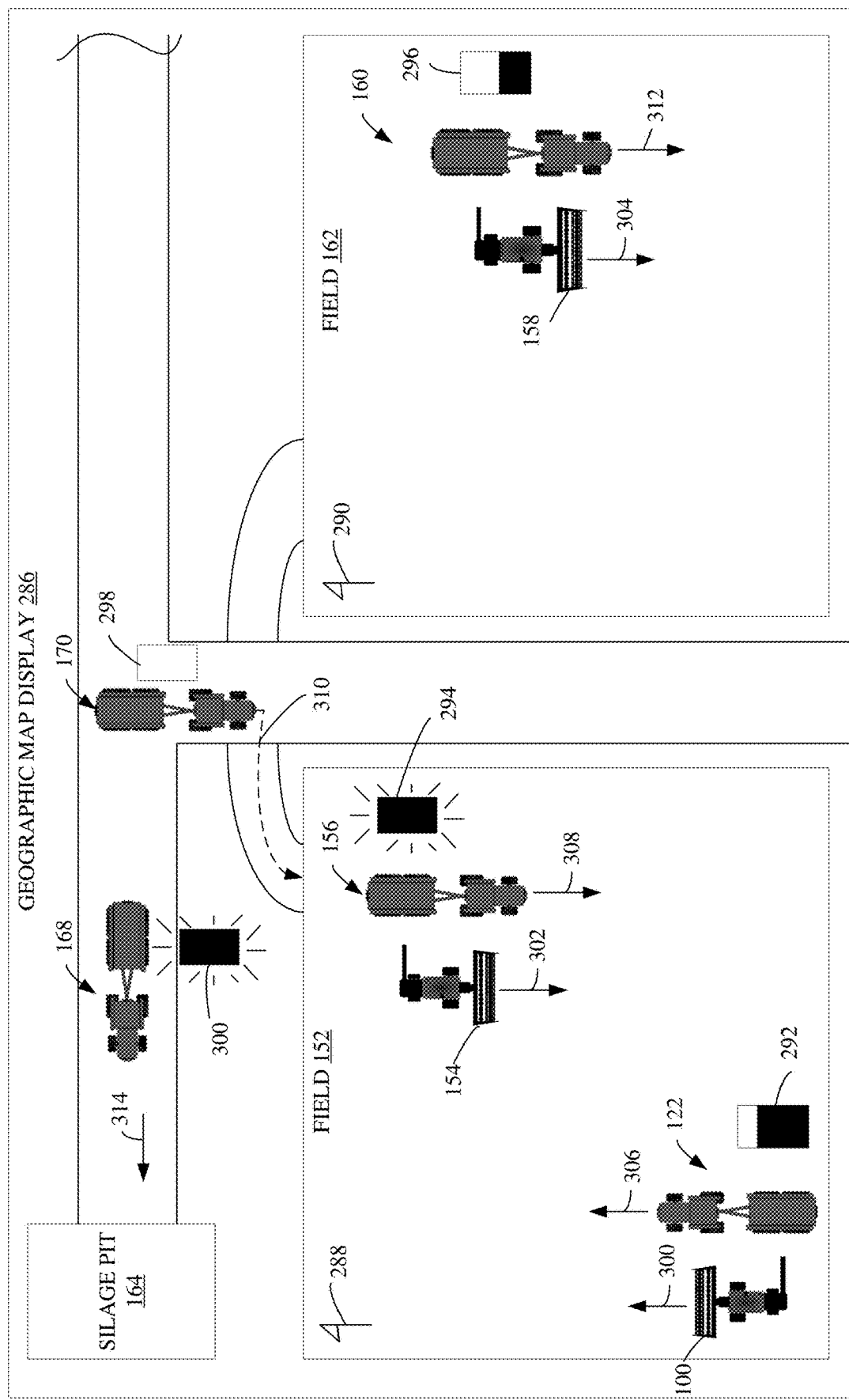
FIG. 8 shows one representation of a geographic map.

FIG. 8 shows one example of a geographic map display 286. The geographic map display 286 shown in FIG. 8 shows many of the items illustrated in the agricultural system 150 shown in FIG. 4, and they are similarly numbered. FIG. 8 shows that vehicle display generator 214 has generated display elements for all of the harvesters 100, 154, and 158 as well as display elements for all of the receiving vehicles 122, 156, 160, 168, and 170. Field flag generator 218 has generated flag display elements 288 and 290 that flag the two fields 152 and 162 that are being harvested in the current harvesting operation by agricultural system 150.

Also, fill level display generator 216 has generated an overall fill level display element for each of the receiving vehicles. For instance, fill level display generator 216 has generated overall fill level display element 292 showing the overall fill level of receiving vehicle 122. Display element 294 shows the overall fill level for receiving vehicle 156. Display element 296 shows the overall fill level for receiving vehicle 160. Display element 298 shows the overall fill level for receiving vehicle 170, and display element 300 shows the overall fill level for receiving vehicle 168.

Also, fill level display generator 216 has generated a display that illustrates how the overall fill level for each of the receiving vehicles compares to the fill level threshold for that receiving vehicle. It can be seen that elements 294 and 300 may be blinking or may be a different color than elements 292, 296 and 298. This indicates that the corresponding receiving vehicles 156 and 168 are filled to a level that meets or exceeds the overall fill level threshold value. Fill level indicators 292, 296 and 298, on the other hand, are illustratively displayed in a different color, or are not blinking, or otherwise visually indicate that the corresponding receiving vehicles 122, 160, and 170 are not filled to a level that meets or exceeds the threshold fill level for those vehicles. Also, the display elements can be displayed to show that the overall fill level for a receiving vehicle is approaching, but has not yet reached, the fill level threshold value. For instance, the color of overall fill level display element can be changed from green to yellow when the overall fill level is within a given range of the threshold value and then changed from yellow to red when the overall fill level reaches the threshold value.

The display shown in FIG. 8 also shows the direction of travel of each of the vehicles. For instance, direction indicator 300 shows the direction of movement of harvester 100. Direction indicator 302 shows the direction of travel of harvester 154 and direction indicator 304 shows the direction of travel of harvester 158. Arrows 306, 308, 310, 312, and 314 show the direction of travel of each of the receiving vehicles 122, 156, 170, 160, and 168, respectively.

The display elements illustrated on the geographic map display 286 allow the operators of the various vehicles to operate more efficiently. For instance, the operator of receiving vehicle 170 can see that receiving vehicle 156 is filled to its overall fill threshold level. The operator of receiving vehicle 170 can also see the location and direction of travel of harvester 154. Thus, the operator of receiving vehicle 170 can quickly move into field 152 to take the place of receiving vehicle 156 which can then travel to silage pit 164 to be unloaded. Similarly, the operator of receiving vehicle 168 is driving receiving vehicle 168 to silage pit 164 to be unloaded. The operator of receiving vehicle 168 can also see that receiving vehicle 122 is nearly full and that harvester 100 is traveling in the direction indicated by direction indicator 300. Thus, the operator of receiving vehicle 168 can see that it is likely that receiving vehicle 168 should proceed to field 152 to take the place of receiving vehicle 122 in receiving harvested material from harvester 100, after receiving vehicle 168 is unloaded at silage pit 164. Also, the operator of receiving vehicle 168 may be able to determine where to enter field 152 to be closest to harvester 100.

The geographic map display 186 may also be displayed for the operators of the harvesters 100, 154, and 158. This enables the operators of all of the vehicles to communicate with one another (such as over radios or otherwise) to coordinate with one another in a highly efficient manner.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, they can be actuated using touch gestures. Also, where the device that displays them has speech recognition components, actuators can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, and/or logic. It will be appreciated that such systems, components, and/or logic can be comprised of hardware items (such as processors and associated memory, or other processing components, some of which are described below) that perform the functions associated with those systems, components, and/or logic. In addition, the systems, components, and/or logic can be comprised of software that is loaded into a memory and is subsequently executed by a processor or server, or other computing component, as described below. The systems, components, and/or logic can also be comprised of different combinations of hardware, software, firmware, etc., some examples of which are described below. These are only some examples of different structures that can be used to form the systems, components, and/or logic described above. Other structures can be used as well.

Figure 9:
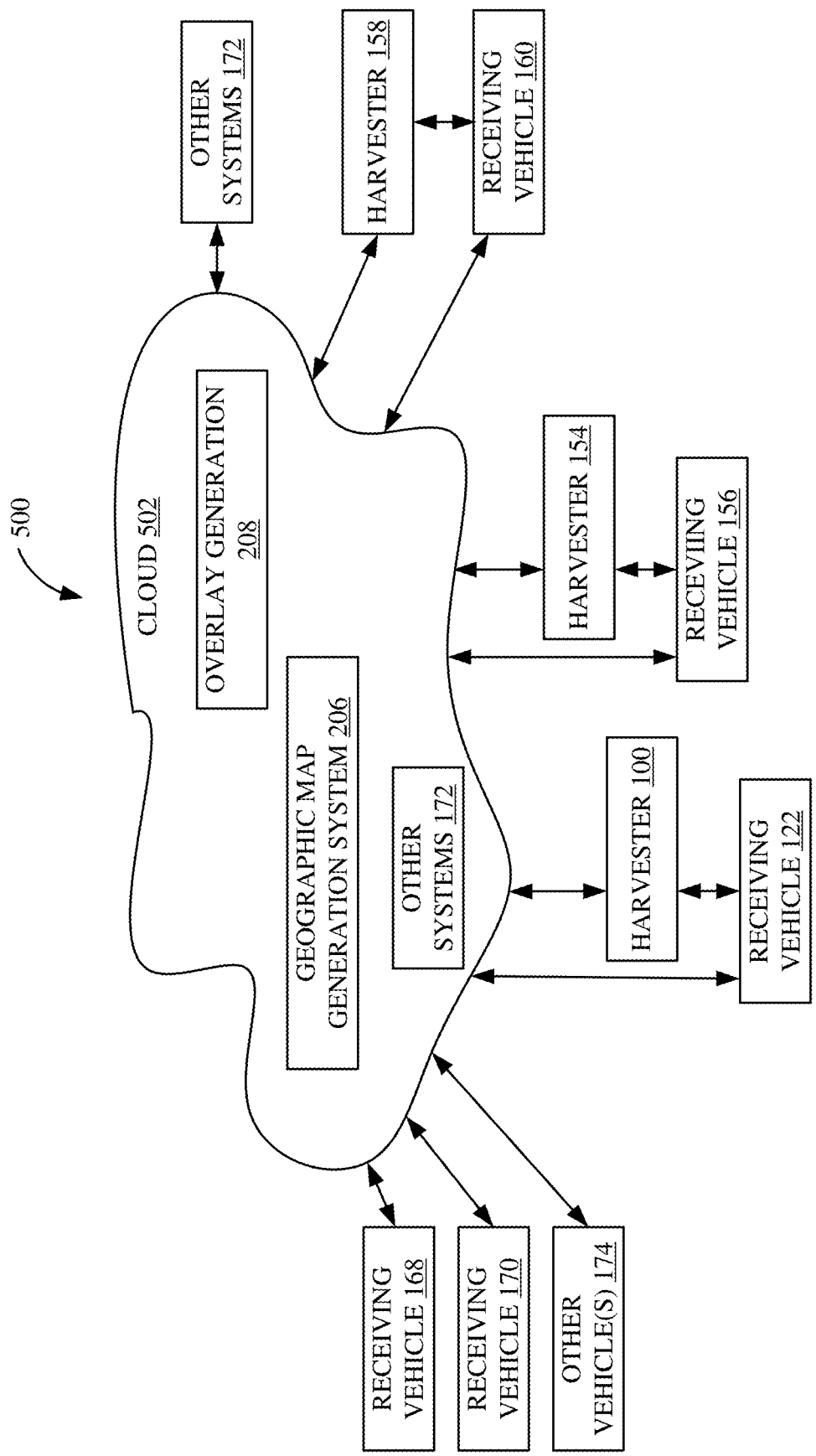
FIG. 9 shows one example of an agricultural architecture deployed in a remote server architecture.

FIG. 9 is a block diagram of harvesters and receiving vehicles and other vehicles shown in FIG. 4, except that they communicate with elements in a remote server architecture 500. In one example, remote server architecture 500 can provide computation, software, data access, and storage services that do not require end-user knowledge of the physical location or configuration of the system that delivers the services. In various examples, remote servers can deliver the services over a wide area network, such as the internee, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 9, some items are similar to those shown in FIG. 4 and they are similarly numbered. FIG. 9 specifically shows that systems 172 and geographic map generation system 206 and overlay generation system 208 can be located at a remote server location 502. Therefore, the harvesters access those systems through remote server location 502.

FIG. 9 also depicts another example of a remote server architecture. FIG. 5 shows that it is also contemplated that some elements of FIG. 4 are disposed at remote server location 502 while others are not. By way of example, map generation system 206 can be disposed at a location separate from location 502, and accessed through the remote server at location 502. Regardless of where they are located, the items can be accessed directly by through a network (either a wide area network or a local area network), the items can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As a harvester or receiving vehicle comes close to the fuel truck for fueling, the system automatically collects the information from the harvester or other vehicle and transfers information to the harvester or receiving vehicle using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester or receiving vehicle until the harvester or receiving vehicle enters a covered location. The harvester or receiving vehicle, itself, can then send the information to the main network.

It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
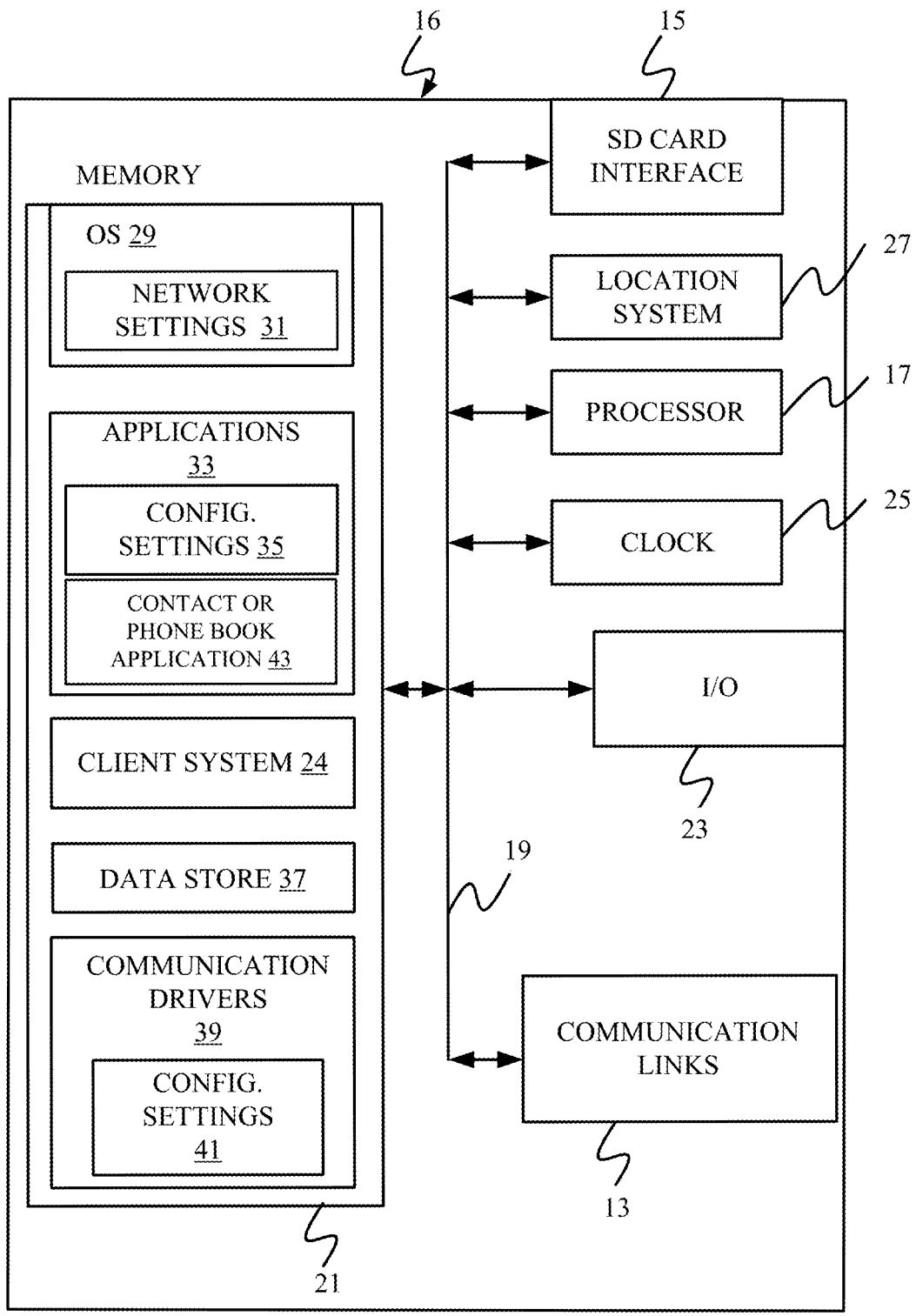
FIGS. 10-12 show examples of mobile devices that can be used in loading vehicles and receiving vehicles.
Figure 11:
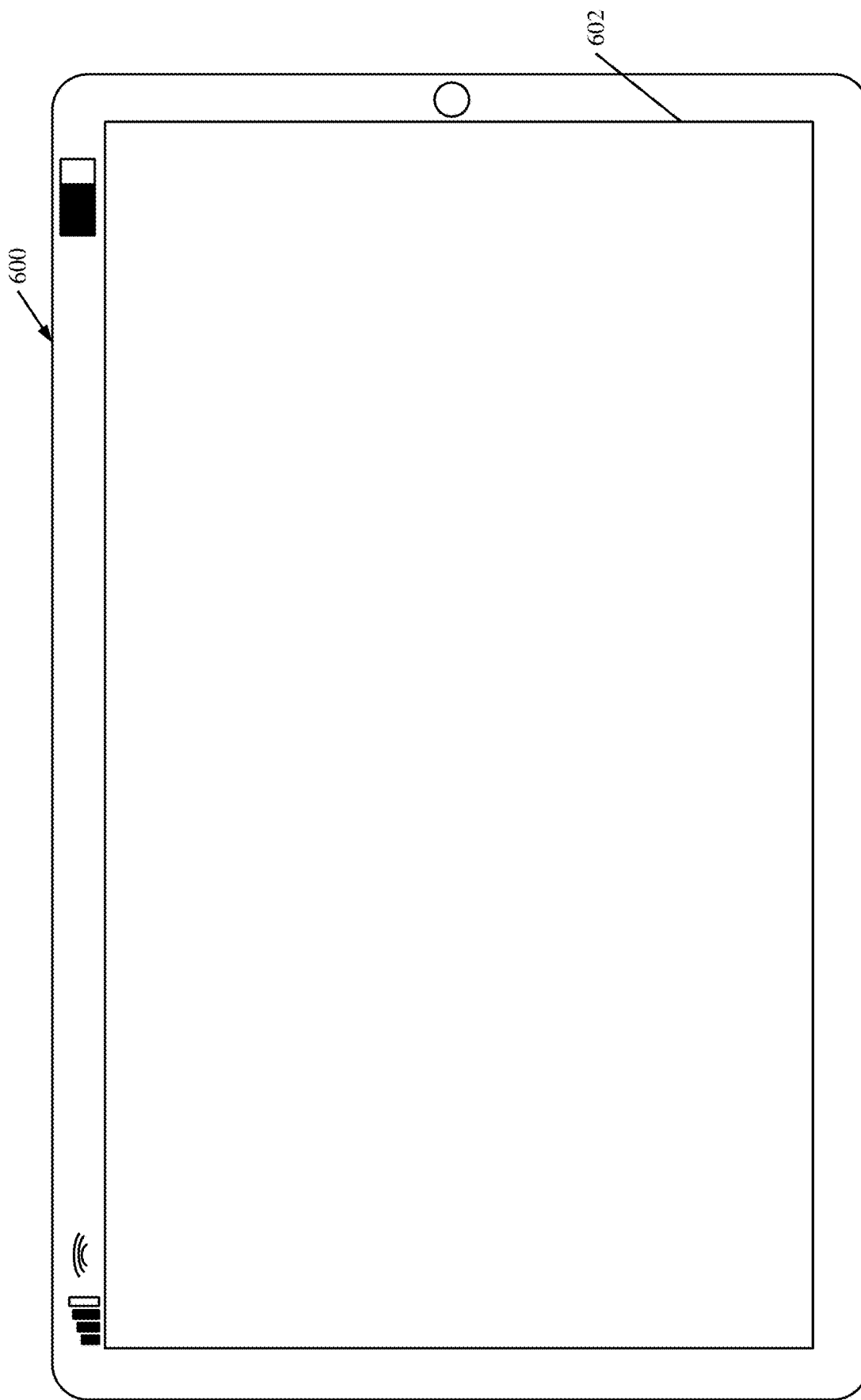
Figure 12:
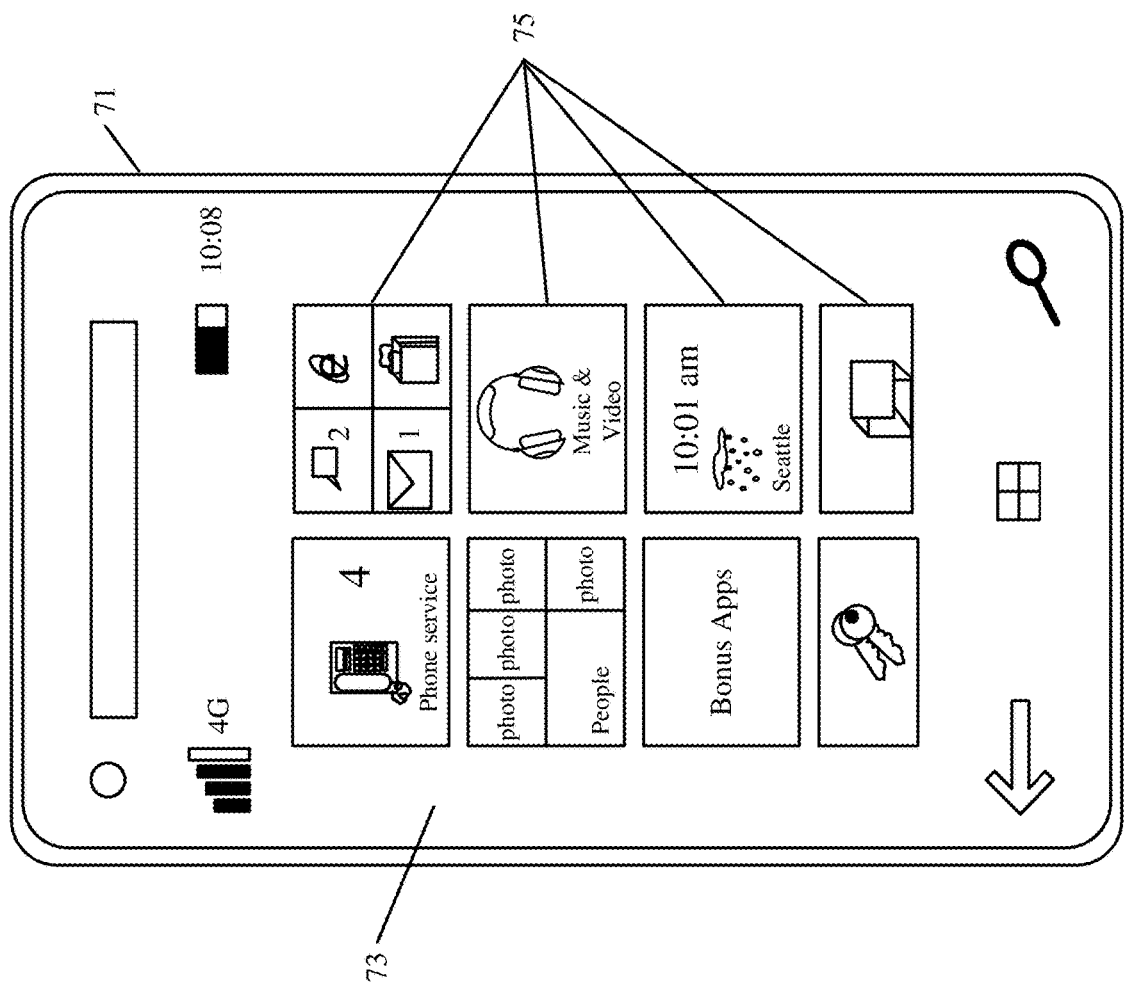

FIG. 10 is a simplified block diagram of one illustrative example of a handheld or mobile computing device that can be used as a user's or client's hand held device 16, in which the present system (or parts of it) can be deployed. For instance, a mobile device can be deployed in the operator compartment of a harvester and/or receiving vehicle for use in generating, processing, or displaying the maps and overall fill levels. FIGS. 11-12 are examples of handheld or mobile devices.

FIG. 10 provides a general block diagram of the components of a client device 16 that can run some components shown in previous FIGS., that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 11 shows one example in which device 16 is a tablet computer 600. In FIG. 10, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
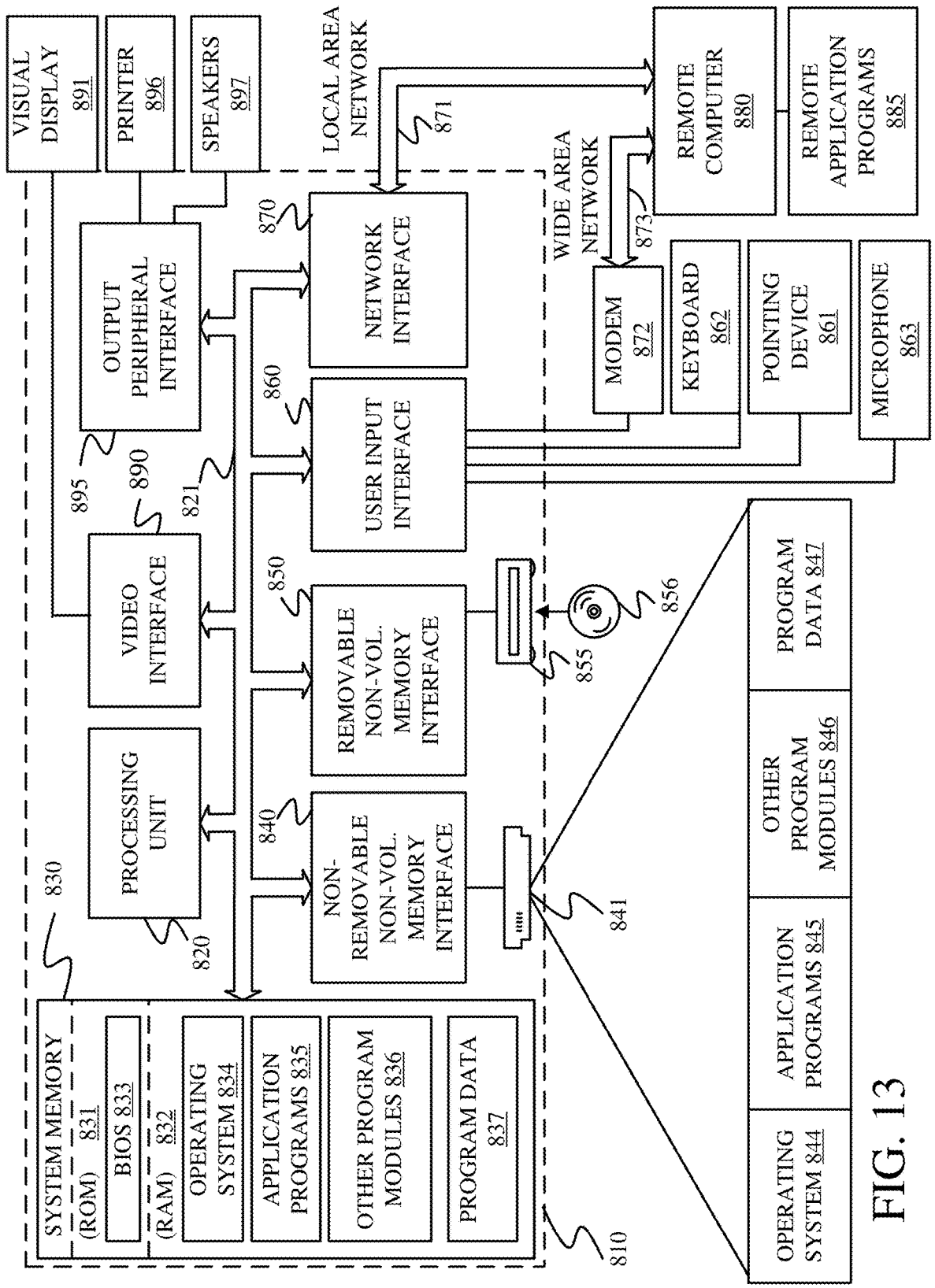
FIG. 13 is a block diagram of a computing environment that can be used in the machines, systems, and architectures shown and discussed with respect to the previous figures.

FIG. 13 is one example of a computing environment in which elements of previous FIGS., or parts of them, (for example) can be deployed. With reference to FIG. 13, an example system for implementing some embodiments includes a computing device in the form of a computer 810 programmed to operate as discussed above. Components of computer 810 may include, but are not limited to, a processing unit 820 (which can comprise a processor or server from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a material moving system, comprising:
a fill level detection system on a filling vehicle that detects an overall fill level of a receiving vehicle that is receiving material from the filling vehicle;
a fill level display generator generating an overall fill level display element indicating the overall fill level of the receiving vehicle; and
a display device that displays a representation of the receiving vehicle and the overall fill level display element.

Example 2 is the material moving system of any or all previous examples wherein the fill level display generator is configured to generate the fill level display element as a gauge display that is visually filled in to indicate the overall fill level of the receiving vehicle.

Example 3 is the material moving system of any or all previous examples wherein the fill level detection system is configured to compare the overall fill level to an overall fill level threshold corresponding to the receiving vehicle to obtain a comparison result.

Example 4 is the material moving system of any or all previous examples wherein the fill level display generator is configured to generate the overall fill level display element to indicate the comparison result.

Example 5 is the material moving system of any or all previous examples wherein the fill level display generator is configured to generate the overall fill level display element to indicate the comparison result based on a color of the overall fill level display element.

Example 6 is the material moving system of any or all previous examples wherein the fill level display generator is configured to generate the overall fill level display element to indicate the comparison result based on a blinking display of the fill level display element.

Example 7 is the material moving system of any or all previous examples wherein the fill level detection system comprises:
an image capture mechanism that captures an image of the receiving vehicle; and
an image processing system that processes the image to identify the overall fill level of the receiving vehicle based on the image.

Example 8 is the material moving system of any or all previous examples wherein the material moving system comprises a plurality of different receiving vehicles operating in an operational geographic area and further comprising:
a geographic map generation system configured to generate a geographic map of the operational geographic area; and
an overlay generation system configured to receive a geographic location value identifying a geographic location of each of the receiving vehicles and generate a receiving vehicle display element for each of the plurality of different receiving vehicles and integrate the receiving vehicle display elements at the geographic locations of the corresponding receiving vehicles on the geographic map.

Example 9 is the material moving system of any or all previous examples wherein the display device is configured to display the geographic map with the receiving vehicle display elements.

Example 10 is the material moving system of any or all previous examples wherein the overlay generation system comprises:
a fill level display generator configured to receive an overall fill level for each of the plurality of different receiving vehicles and generate an overall fill level display element corresponding to each of the plurality of different receiving vehicles and integrate the overall fill level display elements into the geographic map wherein the display device is configured to display the geographic map with the receiving vehicle display elements and the overall fill level display elements at the geographic locations of each of the plurality of different receiving vehicles on the geographic map.

Example 11 is the material moving system of any or all previous examples and further comprising:

a mobile device on each of the plurality of different receiving vehicles, each of the mobile devices running a mobile application to display the geographic map with the receiving vehicle display elements and the overall fill level display elements at the geographic locations of the receiving vehicles on the geographic map.

Example 12 is a material moving system, comprising:
an imager capture mechanism on a filling vehicle that captures an image of a receiving vehicle that is receiving material from the filling vehicle;
a fill level detection system on the filling vehicle that detects an overall fill level of the receiving vehicle based on the captured image;
a fill level display generator generating a gauge display element that is visually filled in to indicate the overall fill level of the receiving vehicle; and
a display device that displays a representation of the receiving vehicle and the gauge display element.

Example 12 is the material moving system of any or all previous examples wherein the fill level detection system is configured to compare the overall fill level to an overall fill level threshold corresponding to the receiving vehicle to obtain a comparison result.

Example 14 is the material moving system of any or all previous examples wherein the fill level display generator is configured to generate the gauge display element to visually indicate the comparison result based on a color of the overall fill level display element.

Example 15 is a material moving system, comprising:
a geographic map generation system configured to generate a geographic map of an operational geographic area where a material moving operation is performed in which a material filling vehicle is operating and in which a plurality of different receiving vehicles are operating;
a vehicle display generator configured to receive a geographic location value identifying a geographic location of each of the plurality of different receiving vehicles and generate a receiving vehicle display element for each of the plurality of different receiving vehicles and integrate each of the receiving vehicle display elements into the geographic map at the geographic location of the corresponding receiving vehicle;
a fill level display generator configured to receive an overall fill level for each of the plurality of different receiving vehicles and generate a plurality of different overall fill level display elements, each of the overall fill level display elements corresponding to one of the plurality of different receiving vehicles and integrate the overall fill level display elements into the geographic map; and
a display device that displays the geographic map with the receiving vehicle display elements and the corresponding overall fill level display elements.

Example 16 is the material moving system of any or all previous examples wherein the fill level display generator is configured to generate each of the overall fill level display elements as a gauge display that is visually filled in to indicate the overall fill level of the corresponding receiving vehicle.

Example 17 is the material moving system of any or all previous examples wherein the fill level display generator is configured to receive a comparison result for each receiving vehicle, the comparison result corresponding to each receiving vehicle being indicative of a comparison of the overall fill level for the corresponding receiving vehicle to an overall fill level threshold corresponding to the receiving vehicle, the fill level display generator being configured to generate the overall fill level display element to indicate the comparison result for the corresponding receiving vehicle.

Example 18 is the material moving system of any or all previous examples wherein the fill level display generator is configured to generate the overall fill level display element to indicate the comparison result by controlling a color of the overall fill level display element.

Example 19 is the material moving system of any or all previous examples wherein the display device comprises:
a plurality of mobile devices, with one of the plurality of mobile devices on each of the plurality of different receiving vehicles, each of the mobile devices running a mobile application to display the geographic map with the receiving vehicle display elements and the overall fill level display elements at the geographic locations of the receiving vehicles on the geographic map.

Example 20 is the material moving system of any or all previous examples wherein the material moving operation is performed in a plurality of different operational geographic areas and wherein the geographic map generation system is configured to flag the plurality of different operational geographic areas on the geographic map.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A material moving system, comprising:
   one or more processors;
   a geographic map generation system, implemented by the one or more processors, configured to generate a geographic map of an operational geographic area in which a material moving operation is performed by a plurality of different receiving vehicles operate and one or more filling vehicles, the map including a plurality of fields, a road, and a material drop off location, the material drop off location separate from the plurality of fields;
   an overlay generation system, implemented by the one or more processors, configured to:
      receive a geographic location value identifying a geographic location of each receiving vehicle of the plurality of different receiving vehicles;
      generate a receiving vehicle display element for each receiving vehicle of the plurality of different receiving vehicles; and
      integrate each receiving vehicle display element at the geographic location of the corresponding receiving vehicle on the geographic map;
   a fill level display generator, implemented by the one or more processors, configured to:
      receive an overall fill level for each of the plurality of different receiving vehicles from a respective fill level detection system on a respective filling vehicle;
      generate an overall fill level display element for each receiving vehicle of the plurality of different receiving vehicles; and
      integrate each overall fill level display element proximate to the receiving vehicle display element of the corresponding receiving vehicle on the geographic map; and
   a mobile application configured to be run on each of a plurality of different mobile devices, each different mobile device of the plurality of different mobile devices on a corresponding one of the plurality of different receiving vehicles and configured to generate a display that includes the geographic map with the receiving vehicle display elements and the overall fill level display elements.

2. The material moving system of claim 1 wherein the fill level display generator is configured to generate each overall fill level display element as a gauge display element, the gauge display element defining a graphical volume that is visually filled in, independently of a distribution of material in the corresponding receiving vehicle, to indicate the overall fill level of the corresponding receiving vehicle.

3. The material moving system of claim 2 wherein each gauge display element comprises:
a first end, a second end, a first side, and a second side, the first end, the second end, the first side, and the second side defining a graphic volume; and
a graphical bar that fills the graphic volume from the first side to the second side and between the first end and the second to end to graphically indicate the overall fill level of the corresponding receiving vehicle.

4. The material moving system of claim 3 wherein the fill level display generator is configured to generate each overall fill level display element to indicate the overall fill level of the corresponding receiving vehicle relative to the corresponding overall fill level threshold for the corresponding receiving vehicle based on a color of each overall fill level display element.

5. The material moving system of claim 3 wherein the fill level display generator is configured to generate each overall fill level display element to indicate the overall fill level of the corresponding receiving vehicle relative to the corresponding overall fill level threshold for the corresponding receiving vehicle based on a blinking display of each fill level display element.

6. The material moving system of claim 3 wherein each respective fill level detection system comprises:
a camera configured to capture an image of a receiving vehicle; and
an image processing system that processes the image to identify the overall fill level of the receiving vehicle based on the image.

7. The material moving system of claim 1 wherein the fill level display generator is configured to generate each overall fill level display element to indicate the overall fill level of the corresponding receiving vehicle relative to a corresponding overall fill level threshold for the corresponding receiving vehicle.

8. The material moving system of claim 1 wherein each mobile device includes a corresponding display device that is configured to display the geographic map.

9. A material moving system comprising:
one or more processors;
a geographic map generation system, implemented by the one or more processors, configured to generate a geographic map of an operational geographic area where a material moving operation is performed in which one or more material filling vehicles are operating and in which a plurality of different receiving vehicles are operating, the map including a plurality of fields, a road, and a material drop off location, the material drop off location separate from the plurality of fields;
a vehicle display generator, implemented by the one or more processors, configured to:
receive a plurality of geographic location values, each geographic location value, of the plurality of geographic location values, identifying a geographic location of one of the plurality of different receiving vehicles;
generate a separate receiving vehicle display element for each of the plurality of different receiving vehicles; and
integrate each separate receiving vehicle display element into the geographic map at the geographic location of the corresponding receiving vehicle;
a fill level display generator, implemented by the one or more processors, configured to:
receive an overall fill level for each of the plurality of different receiving vehicles;
generate a separate overall fill level display element for each of the plurality of different receiving vehicles; and
integrate each separate overall fill level display element into the geographic map; and
a display device that displays the geographic map with the receiving vehicle display elements and the overall fill level display elements.

10. The material moving system of claim 9 wherein the fill level display generator is configured to generate each of the separate overall fill level display elements as a gauge display that is visually filled in to indicate the overall fill level of the corresponding receiving vehicle.

11. The material moving system of claim 10 wherein the fill level display generator is configured to receive a comparison result for each receiving vehicle, the comparison result corresponding to each receiving vehicle being indicative of a comparison of the overall fill level for the corresponding receiving vehicle to an overall fill level threshold corresponding to the receiving vehicle, the fill level display generator being configured to generate the separate overall fill level display element corresponding to each receiving vehicle to indicate the comparison result for the corresponding receiving vehicle.

12. The material moving system of claim 11 wherein the fill level display generator is configured to generate each separate overall fill level display element to indicate the corresponding comparison result by controlling a color of each separate overall fill level display element.

13. The material moving system of claim 12 wherein the display device comprises:
a plurality of mobile devices, with one of the plurality of mobile devices on each of the plurality of different receiving vehicles, each of the mobile devices running a mobile application to display the geographic map with the receiving vehicle display elements and the overall fill level display elements at the geographic locations of the receiving vehicles on the geographic map.

14. The material moving system of claim 9 wherein the geographic map generation system is configured to flag each field of the plurality of fields where a material filling vehicle, of the one or more material filling vehicles, is operating on the geographic map.

15. The material moving system of claim 9 wherein the vehicle display generator is further configured to:
receive a geographic location value identifying a geographic locations of the material filling vehicle;
generate a material filling vehicle display element for the material filling vehicle; and
integrate the material filling vehicle display element into the geographic map at the geographic location of the material filling vehicle.

16. The material moving system of claim 9 and further comprising:
   a mileage counter configured to generate a mileage output for each of the plurality of receiving vehicles, each mileage output indicative of the miles traveled by the corresponding receiving vehicle during operation in the operational geographic area.

\* \* \* \* \*